H. W. ALDEN.
AUTOMOBILE RUNNING GEAR.
APPLICATION FILED JUNE 14, 1913.
1,101,674.
Patented June 30, 1914.
2 SHEETS—SHEET 1.
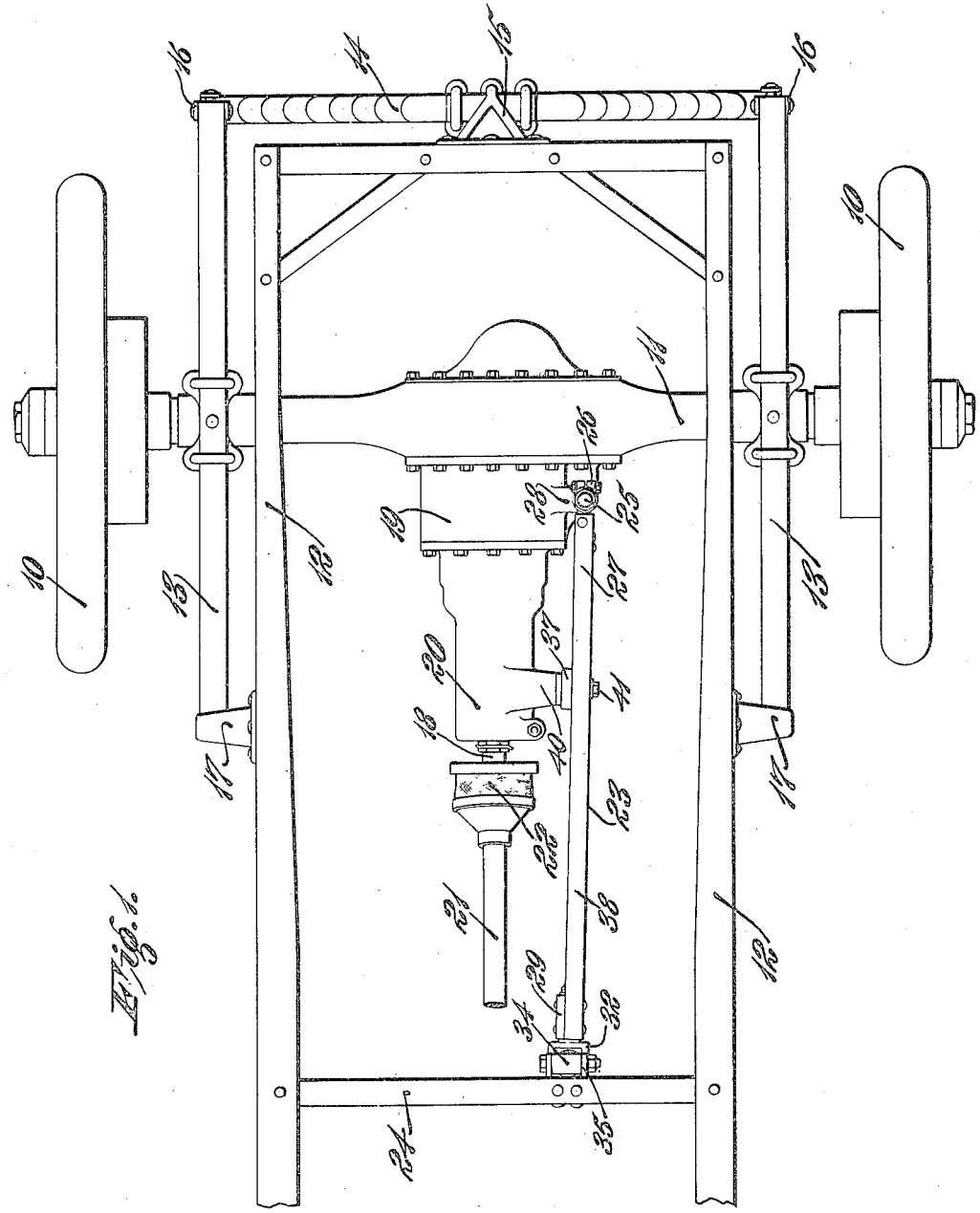

H. W. ALDEN.
AUTOMOBILE RUNNING GEAR.
APPLICATION FILED JUNE 14, 1913.
1,101,674.
Patented June 30, 1914.
2 SHEETS—SHEET 2.
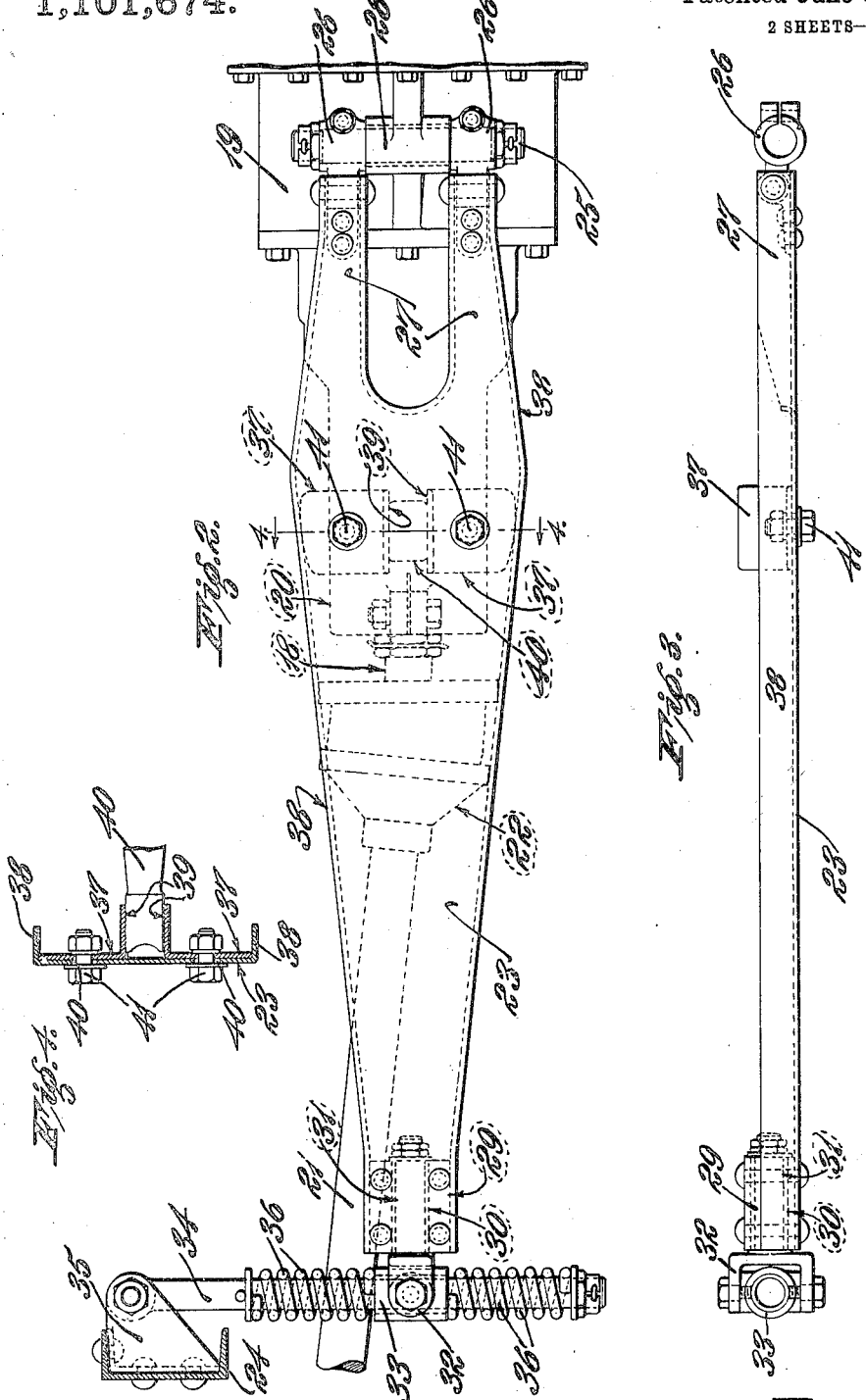

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

AUTOMOBILE RUNNING-GEAR.

1,101,674.

Specification of Letters Patent. Patented June 30, 1914.

Application filed June 14, 1913. Serial No. 773,649.

*To all whom it may concern:*

Be it known that I, HERBERT W. ALDEN, a citizen of the United States, and a resident of the city of Detroit, in the county of Wayne and State of Michigan, have invented a new and useful Improvement in Automobile Running-Gears, of which the following is a specification.

This invention relates to automobiles of the type wherein the driving wheels are rotated by means of shaft sections mounted in a fixed axle, or axle housing, upon which the main frame of the vehicle is supported by springs. In automobiles of the type to which this invention relates the motor is mounted on the main frame, and its power is transmitted to the shaft sections which drive the wheels by means of a propeller shaft connected to the motor by suitable means at one end and operatively connected through angle gearing to the driving wheel shaft sections at its other end. The transmission of the driving force, or torque, from the motor to the driving wheel shafts through angle gearing located on the vehicle axle tends to rotate the fixed axle housing in the direction opposite to that of the driving wheels, and unless other means be provided for preventing the rotation of the fixed axle housing this duty falls upon the vehicle springs. Moreover, the weight of the end of the propeller shaft and gearing connecting it to the driving wheel shaft sections tends to rotate the fixed axle housing. The springs are designed ordinarily to sustain vertical loads due to the weight of the vehicle, and not to resist twisting due to rotation of the axle, and accordingly a special rod, called a torque arm, is sometimes provided to prevent rotation of the axle and thereby relieve the springs of twisting stresses.

This invention consists in an improved arrangement and construction of axle housing and torque arm for an automobile driving wheel axle whereby the weight of the parts is reduced without lessening their rigidity.

One object of the invention is to distribute the strains in the axle housing due to the driving torque.

A further object of the invention is to enable the weight of the end of the propeller shaft and gearing connecting it to the driving wheel shaft sections to be supported directly from the vehicle frame without subjecting the axle housing or vehicle springs to any twisting stresses.

Further objects of the invention appear more fully in connection with the following description of the embodiment thereof shown in the accompanying drawings, and what the invention consists of is set forth particularly in the appended claims.

In the drawings, in which like characters are used to designate the same parts in the several views,—Figure 1 is a top plan view of a portion of the frame of an automobile, showing a pair of driving wheels and the running gear and driving means therefor; Fig. 2 is an enlarged side elevation of the torque arm and a portion of the axle housing and propeller shaft, showing the connections between the torque arm and vehicle frame; Fig. 3 is a top plan view of the torque arm to the same scale as Fig. 2; and Fig. 4 is a cross section of the torque arm on the line 4—4 of Fig. 2, showing a portion of the axle housing in elevation.

Referring to the drawings, the road wheels 10 are rotatably mounted at the ends of the fixed axle housing 11, upon which the frame 12 is supported by means of half elliptic side springs 13 secured at their middle points to the axle housing, and an inverted half elliptic cross spring 14 secured at its middle point to a cross bar of the frame by means of a bracket 15 and suspended at its ends by means of links 16 hung from the adjacent ends of the side springs. The opposite ends of the side springs are pivoted to the hangers 17 which are secured to the frame.

The road wheels are driven by half length shaft sections axially arranged within the fixed axle housing 11 and extending from the wheel hubs to about the middle of the fixed axle housing. The inner ends of the half length shaft sections are operatively connected to the stub shaft 18 through equalizing gears and angle gearing arranged in the casing 19 which is bolted to one side of the enlarged middle portion of the fixed axle housing. The stub shaft 18 is rotatably mounted in a projecting portion 20 of the casing 19, herein referred to as the axle nose. This stub shaft is operatively connected to the propeller shaft 21 by means of an universal joint 22, whereby there may be limited angular movement of the axle nose and stub axle with respect to the propeller shaft.

The fixed axle housing is held from undue rotation on its axis by means of a torque arm 23 secured at one end to the casing 19 and supported at its other end from the cross bar 24 of the frame. The torque-arm is made of sheet steel flanged along its edges to give it stiffness. It is arranged with its principal plane vertical, and is pivoted to the fixed axle housing by means of a vertical pin 25 secured in clamps 26 fixed at the ends of top and bottom forks 27 at one end of the torque arm. This pin is journaled in a vertical socket or bushing in a lug 28 on the side of the casing 19. The lug 28 is embraced above and below its ends by the inner faces of the end clamps 26.

The end of the torque arm away from the fixed axle housing is provided with a swivel fitting 29 having a lengthwise socket or bushing 30 within which is journaled the swivel stem 31. The trunnions 32 of the swivel are disposed with their axis horizontal, and they are pivotally secured to the sleeve 33 which is slidably arranged on the vertical rod 34. This rod is pivotally suspended from a hanger 35 fixed to the frame cross bar 24 so as to swing in a vertical plane toward and away from the fixed axle housing. Open coil springs 36 are arranged on the rod above and below the sleeve 33 and are held in position by washers at their ends. These springs hold the sleeve in its normal position on the rod, but permit it to slide up or down in response to sudden or excessive loads upon the torque arm, thus cushioning the latter and reducing the stresses therein caused by shocks.

The torque arm is provided with two adjustable slides 37 fitting between the converging top and bottom flanges 38 of the torque arm, and having horizontal bearings 39 arranged above and below the lug 40 which projects from the side of the axle nose. These slides are clamped in adjustable position by means of clamp bolts 41 arranged in holes 42 in the torque arm of larger diameter than the bolts. By moving the slides along the torque arm and keeping their outer edges against the converging top and bottom flanges thereof, a very accurate and positive adjustment of the bearing faces of the slides may be obtained. The outer edges of the slides are slightly curved so that they may rock slightly in order that the bearing surfaces may seat themselves on the bearing faces of the lug 40. Thus the weight of the end of the propeller shaft, axle nose, stub shaft and gearing contained in the chamber 19 is borne by the torque arm directly, and there is no tendency of these parts to rotate the fixed axle housing.

It is evident that the forms of the several parts of the torque arm construction above described are capable of modification, and this invention is not restricted to the precise forms shown in the drawings.

What I claim as my invention is as follows:

1. In combination with an axle casing and frame of an automobile, a torque arm having one end pivotally connected to said axle casing and its other end pivotally supported on said frame, parallel ways on said torque arm intermediate its ends, and a rigid projecting member on said axle casing slidably engaging said parallel ways.

2. In combination with an axle casing and frame of an automobile, a torque arm having one end pivotally connected to said axle casing and its other end pivotally supported on said frame, a transverse bearing on said torque arm intermediate its ends, and a bearing member on said axle casing slidably engaging said transverse bearing.

3. In combination with an axle casing and frame of an automobile, a torque arm having one end pivotally connected to said axle casing and its other end pivotally supported on said frame, slides adjustably mounted on said torque arm intermediate its ends, with their bearing surfaces disposed in parallel relation, and a supporting member on said axle casing slidably engaging said bearing surfaces.

4. A pressed steel torque arm for automobiles, said torque arm consisting of a body portion tapering toward its ends from a point intermediate thereof, a pivot connection at one end of said body portion and a swivel connection at its other end, and a cross slide bearing arranged on said body near its widest point.

5. A pressed steel torque arm for automobiles, said torque arm consisting of a body portion tapering toward its ends from a point intermediate thereof, said body portion being flanged on one side along its top and bottom edges, and a cross slide bearing seated between said flanges on said body near its widest point.

6. A pressed steel torque arm for automobiles, said torque arm consisting of a body portion tapering toward its ends from a point intermediate thereof, said body portion being flanged on one side along its top and bottom edges, and a cross slide bearing seated between said flanges on said body near its widest point, said cross slide bearing comprising two portions movable along said converging flanges whereby their distance apart may be adjusted, and means for clamping said bearing portions in adjusted position.

Signed at Detroit, Mich., this 7th day of June, 1913.

HERBERT W. ALDEN.

Witnesses:
W. C. WOOD,
LESLIE WILLIAMS.